United States Patent [19]

Sala et al.

[11] Patent Number: 4,913,946

[45] Date of Patent: Apr. 3, 1990

[54] FLUORESCENT ADHESIVE TAPE FOR USE AS A HIGHLIGHTER

[75] Inventors: Guido Sala, Milan; Ivano Zucchiatti, Arese, both of Italy

[73] Assignees: Incas International Carbon Solvent, Passirana di Rho; SICAD Spa, Uboldo, both of Italy

[21] Appl. No.: 14,810

[22] Filed: Feb. 13, 1987

[30] Foreign Application Priority Data

Jan. 8, 1987 [IT] Italy ............................... 20433/87[U]

[51] Int. Cl.$^4$ ........................... B32B 7/12; C09J 7/02
[52] U.S. Cl. ..................................... 428/38; 428/343; 428/352
[58] Field of Search ................. 428/38, 343, 352, 690, 428/488.4; 116/234, 235, 236, 237, 240; 283/39, 40, 42; 427/157

[56] References Cited

U.S. PATENT DOCUMENTS

| | | | |
|---|---|---|---|
| 3,583,358 | 6/1971 | Hanson | 116/235 |
| 4,019,759 | 4/1977 | Stanton | 283/42 |
| 4,175,777 | 11/1979 | Horn | 40/359 |
| 4,186,683 | 2/1980 | LeRoy | 116/235 |

FOREIGN PATENT DOCUMENTS

| | | | |
|---|---|---|---|
| 665367 | 6/1963 | Canada | 427/157 |
| 0158573 | 10/1985 | European Pat. Off. | 428/343 |
| 0030556 | 8/1980 | Japan | 428/690 |
| 20466 | 5/1984 | Japan | 427/157 |
| 2163270 | 2/1986 | United Kingdom | 428/488.4 |

Primary Examiner—Nancy Swisher
Attorney, Agent, or Firm—Stevens, Davis, Miller & Mosher

[57] ABSTRACT

A fluorescent adhesive tape for use as a highlighter to apply to a support with writing, consisting of a transparent or semi-transparent film to which there are applied a layer of fluorescent colored ink of high dry-substance content, and a layer of adhesive of low adhesive power which allows removal from said support without alteration of the support itself or of the writing.

Said adhesive tape can be applied to exercise books, magazines, books etc., for school, the office and the home, and finds use in many other sectors.

10 Claims, No Drawings

FLUORESCENT ADHESIVE TAPE FOR USE AS A HIGHLIGHTER

This invention relates to a fluorescent adhesive tape suitable for use as a highlighter for application to exercise books, magazines, books etc., in school, the office and the home, and for use in many other sectors.

The practice of highlighting determined words or phrases in the context of a larger sentence is very useful, and its use is therefore becoming increasingly widespread in the various sectors.

For example, in school the student finds it most useful to highlight in a textbook or exercise book those few lines which summarise or indicate the entire argument of an entire page; in various work activities it is very useful to highlight particular phrases of circulars, operating procedures, expiry dates etc.

Examples of this kind are very numerous in daily practice.

Highlighting is currently effected by means of highlighter pens which are completely satisfactory in highlighting those phrases of interest, but have the great drawback of marking the page permanently and indelibly.

For this reason they are suitable for use only on low-value exercise books, books, magazines etc., whereas they can never be used on magazines, books or works of value or those which must be perserved in perfect condition.

This drawback therefore limits the use of the highlighter in numerous cases in which highlighting would be very useful.

This drawback is obviated by the use of the fluorescent adhesive tape of the present invention which, when applied over the writing of interest, gives excellent highlighting, whereas when highlighting is no longer required it can be removed without damaging the substrate and relative writing, so restoring the book, exercise book, magazine etc. to its original state.

The fluorescent adhesive tape for use as a highlighter to apply to a support with writing according to the present invention is characterized in that on a transparent or semi-transparent film there is applied a layer of fluorescent colored ink of high dry-substance content, and a layer of adhesive of low adhesive power which allows removal from said support without altering the support itself or the writing.

These and further characteristics and advantages of the adhesive tape according to the present invention will be more apparent from the description of preferred embodiments of the invention given hereinafter by way of non-limiting example.

The film which acts as the support for the application of the ink and adhesive consists of a transparent or semitransparent polymeric material such as polyvinyl chloride, polypropylene, cellulose acetate or polyester. The support has a thickness of between 15 and 65 microns.

The fluorescent ink, applied to one face of transparent film or support has the following chemical composition:

| | |
|---|---|
| Pigment | 33–37% by weight |
| Acrylic resin | 9–12% by weight |
| Synthetic wax | 0.3–1% by weight |
| Phthalic acid esters | 4–5% by weight |
| Ethyl acetate | 38–43% by weight |
| Ethanol | 9–11% by weight. |

This ink is applied in a quantity of 3–4 g per $m^2$ of tape surface, and in addition to its transparency and fluorescence characteristics has a high resistance to the adhesive with which it comes into contact on being made up into reels.

It is also possible to write on this ink with both pencil and pen.

As an alternative, an ink having a lower dry-substance content, for example 30% by weight, could be used and applied by coating or by rotogravure printing.

On a second face of the support there is applied an adhesive of low adhesion in order to be able to remove the tape when applied to a page, without altering either the page or the writing.

Said adhesive has the following chemical composition:

| | |
|---|---|
| Natural rubber | 65–75% by weight |
| Hydrocarbon resins | 25–35% by weight |
| Polyisobutylene | 0–10% by weight |
| Polybutenes | 0–10% by weight. |

This adhesive is applied in a quantity of 12–15 g per $m^2$ of tape.

As an alternative to the described embodiment, if a semitransparent support is used on which it is possible to write, the ink can be applied as an intermediate layer between the support and adhesive.

The fluorescent adhesive tape according to the present invention can be produced in various colors depending on the ink pigment, for example it can be of yellow, orange, green, lilac or other color, to give the product and its use a particular aesthetic significance which allows personal creativity.

It is made up into reels in a manner analogous to normal adhesive tape.

Its possible applications are widespread in school, in the office, in the home and in many other sectors.

Some of its more widespread applications are: to highlight writing, protect writing, decorate particular pages, and personalize books, magazines or notebooks. Other applications have an accident-prevention object, such as in coloring bicycle spokes, or in highlighting windows or other objects with which it is dangerous to collide.

We claim:

1. A fluorescent tape for use as a highlighter to apply to a support with writing, comprising a transparent or semi-transparent film having a layer of fluorescent colored ink and a layer of adhesive of low adhesive power which allows removal from said support without altering the support itself or the writing.

2. A tape as claimed in claim 1, wherein said film consists of a polymeric material selected from the group consisting of polyvinyl chloride, polypropylene, cellulose acetate and polyester.

3. A tape as claimed in claim 1, wherein said film has a thickness of between 15 and 65 microns.

4. A tape as claimed in claim 1, wherein said ink layer is applied to one face of said film and said adhesive layer is applied a second face.

5. A tape as claimed in claim 1, wherein said ink is applied as an intermediate layer between said film and said adhesive.

6. A tape as claimed in claim 1, wherein said ink has the following chemical composition:

| | |
|---|---|
| Pigment | 33–37% by weight |
| Acrylic resin | 9–12% by weight |
| Synthetic wax | 0.3–1% by weight |
| Phthalic acid esters | 4–5% by weight |
| Ethyl acetate | 38–43% by weight |
| Ethanol | 9–11% by weight. |

7. A tape as claimed in claim 1, wherein said ink is applied in a quantity of 3–4 g per $m^2$ of tape surface.

8. A tape as claimed in claim 1, wherein said adhesive has the following chemical composition:

| | |
|---|---|
| Natural rubber | 65–75% by weight |
| Hydrocarbon resins | 25–35% by weight |
| Polyisobutylene | 0–10% by weight |
| Polybutenes | 0–10% by weight. |

9. A tape as claimed in claim 1, wherein said adhesive is applied in a quantity of 12–15 g per $m^2$ of tape.

10. A tape as claimed in claim 1, wherein said ink is yellow, orange, green or lilac.

* * * * *